US008941796B2

(12) United States Patent
Yokota

(10) Patent No.: US 8,941,796 B2
(45) Date of Patent: *Jan. 27, 2015

(54) LIGHT SOURCE UNIT, LIGHTING DEVICE, DISPLAY DEVICE, TELEVISION RECEIVER, AND METHOD OF MANUFACTURING BOARD FOR LIGHT SOURCE UNIT

(75) Inventor: Masashi Yokota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 462 days.

This patent is subject to a terminal disclaimer.

(21) Appl. No.: 13/376,214

(22) PCT Filed: Apr. 6, 2010

(86) PCT No.: PCT/JP2010/056218
§ 371 (c)(1),
(2), (4) Date: Dec. 5, 2011

(87) PCT Pub. No.: WO2010/146919
PCT Pub. Date: Dec. 23, 2010

(65) Prior Publication Data
US 2012/0081630 A1    Apr. 5, 2012

(30) Foreign Application Priority Data

Jun. 15, 2009   (JP) .................... 2009-142089

(51) Int. Cl.
*G02F 1/1335*   (2006.01)
*F21S 4/00*   (2006.01)
(Continued)

(52) U.S. Cl.
CPC .... *G02F 1/133608* (2013.01); *G02F 1/133603* (2013.01); *G02F 2201/465* (2013.01); *G02F 2201/133607* (2013.01); *G02F 2001/133612* (2013.01)

USPC .......... 349/61; 362/249.02; 362/631

(58) Field of Classification Search
CPC ............. F21Y 2101/02; Y10S 362/80; H05K 2201/10106; G02F 1/133603; G02F 2001/133612
USPC ............ 349/61; 362/97.3, 249.02, 249.04, 362/249.06, 612, 613, 630, 631, 800
See application file for complete search history.

(56) References Cited

U.S. PATENT DOCUMENTS 4,439,818 A * 3/1984 Scheib .............. 362/249.06
5,931,577 A * 8/1999 Ishibashi .......... 362/249.04
(Continued)

FOREIGN PATENT DOCUMENTS

CN    101319759 A    12/2008
DE    10 2005 050 254 A1    4/2007
(Continued)

OTHER PUBLICATIONS

Official Communication issued in International Patent Application No. PCT/JP2010/056218, mailed on Jun. 29, 2010.
(Continued)

Primary Examiner — Robert Tavlykaev
(74) Attorney, Agent, or Firm — Keating & Bennett, LLP

(57) ABSTRACT

It is an object of the present invention to provide a light source unit enabling cost reduction. A light source unit of the present invention includes a plurality of LEDs 16, and an elongated LED board 17 having a plurality of arranging portions 18 on which each LED 16 is arranged, and a plurality of connecting portions 19 connecting the adjacent arranging portions 18. Each connecting portion 19 has a width smaller than a width of each arranging portion 18 in a short direction of the LED board 17.

13 Claims, 17 Drawing Sheets

(51) Int. Cl.
*F21V 21/00* (2006.01)
*F21V 7/04* (2006.01)

(56) References Cited

U.S. PATENT DOCUMENTS

| | | | |
|---|---|---|---|
| 7,090,377 B2 * | 8/2006 | Chen | 362/249.04 |
| 7,637,626 B2 * | 12/2009 | Park et al. | 362/97.3 |
| 7,894,015 B2 * | 2/2011 | Kawase | 349/58 |
| 7,940,349 B2 * | 5/2011 | Jeon et al. | 349/62 |
| 8,525,952 B2 * | 9/2013 | Tanaka et al. | 349/69 |
| 2006/0061539 A1 | 3/2006 | Song et al. | |
| 2006/0158882 A1 | 7/2006 | Klomp et al. | |
| 2006/0164840 A1 | 7/2006 | Song et al. | |
| 2007/0035679 A1 | 2/2007 | Lee et al. | |
| 2007/0257871 A1 | 11/2007 | Watanabe et al. | |
| 2008/0049164 A1 | 2/2008 | Jeon et al. | |
| 2008/0303757 A1 | 12/2008 | Ohkawa et al. | |
| 2009/0021932 A1 | 1/2009 | Kim et al. | |
| 2009/0046445 A1 | 2/2009 | Namiki et al. | |
| 2009/0051707 A1 | 2/2009 | Hirata et al. | |
| 2009/0168399 A1 | 7/2009 | Kim et al. | |
| 2009/0273920 A1 | 11/2009 | Song et al. | |
| 2011/0026241 A1 | 2/2011 | Kim et al. | |

FOREIGN PATENT DOCUMENTS

| | | | | |
|---|---|---|---|---|
| JP | 2004-103993 A | | 4/2004 | |
| JP | 2005-538546 A | | 12/2005 | |
| JP | 2006-093074 A | | 4/2006 | |
| JP | 2007-317423 A | | 12/2007 | |
| JP | 2008-108758 A | | 5/2008 | |
| JP | 2008-282754 | * | 11/2008 | F21S 2/00 |
| JP | 2009-105070 A | | 5/2009 | |
| WO | 2008/007492 A1 | | 1/2008 | |

OTHER PUBLICATIONS

Yokota, "Light Source Unit, Lighting Device, Display Device, Television Receiver, and Method of Manufacturing Reflection Sheet for Light Source Unit", U.S. Appl. No. 13/376,220, filed Dec. 5, 2011.
Yokota, "Lighting Device, Display Device and Television Receiver", U.S. Appl. No. 13/376,217, filed Dec. 5, 2011.

* cited by examiner

FIG.16
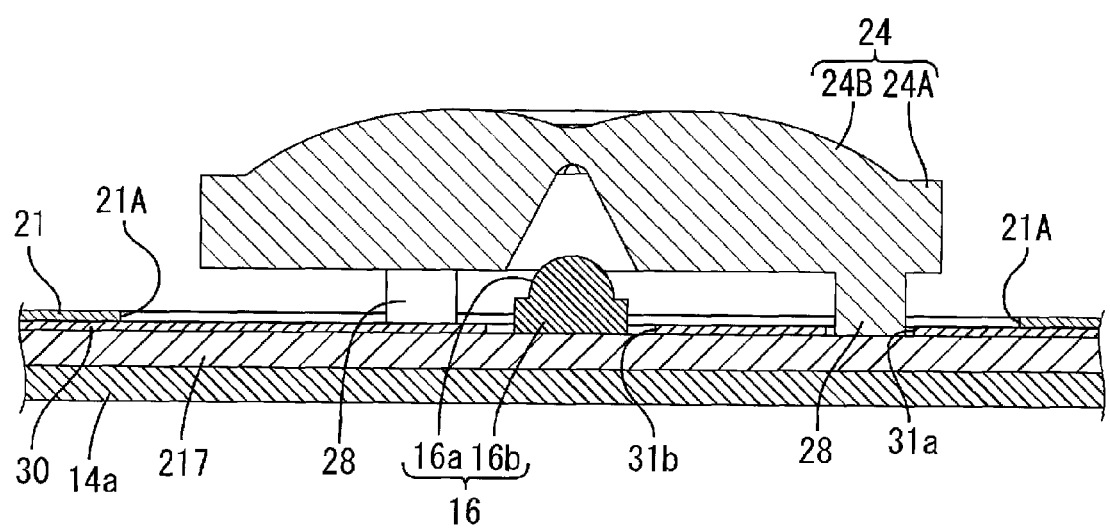
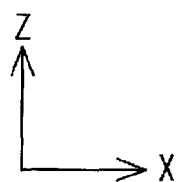

LIGHT SOURCE UNIT, LIGHTING DEVICE, DISPLAY DEVICE, TELEVISION RECEIVER, AND METHOD OF MANUFACTURING BOARD FOR LIGHT SOURCE UNIT

TECHNICAL FIELD

The present invention relates to a light source unit, a lighting device, a display device, a television receiver, and a method of manufacturing a board for a light source unit.

BACKGROUND ART

In recent years, display elements of image display devices including television receivers are shifting from conventional cathode-ray tube displays to thin-screen display devices to which thin-screen display elements including liquid crystal panels and plasma display panels are applied. This enables the display device to be thinner. A liquid crystal display device requires a backlight unit as a separate lighting device because a liquid crystal panel used therein is not a light-emitting component. Examples of the backlight units include a backlight unit described in the following Patent Document 1. In the backlight unit described in Patent Document 1, a light source unit is configured by linearly arranging a plurality of LEDs (light sources) on a rectangular board, and the light sources are two-dimensionally arranged by arranging the plurality of light source units.

Patent Document 1: Japanese Unexamined Patent Publication No. 2007-317423

Problem to be Solved by the Invention

In order to provide a low-cost backlight unit to a customer, cost reductions of the backlight unit and the light source unit which is a component thereof are always required.

For cost reduction, it is effective to reduce costs of components of the backlight unit, particularly the plurality of light source units arranged, and there is room for improvement in this point.

Disclosure of the Present Invention

The present invention was accomplished in view of the above circumstances. It is an object of the present invention to provide a light source unit capable of cost reduction. It is another object of the present invention to provide a lighting device, a display device and a television receiver including such a light source unit, and a method of manufacturing a board for a light source unit.

Means for Solving the Problem

A light source unit according to the present invention includes a plurality of light sources, and an elongated board having a plurality of arranging portions and a plurality of connecting portions. Each arranging portion has each light source thereon and each connecting portion connects the arranging portions that are adjacent to each other. Each connecting portion has a width smaller than a width of each arranging portion in a short direction of the board.

The respective arranging portions on which the light source is arranged are connected with each other by the connecting portions. Thereby, each light source or the light source unit itself has improved ease of handling, and for example, cost reduction can be achieved. However, each of arranging portions needs to have a certain width in order to arrange the light sources. On the other hand, each connecting portion connecting the arranging portions may not necessarily have the same width as that of each of the arranging portions. In the present invention, the width of each of the collateral connecting portions in the short direction of the board is set to be smaller than that of each of the arranging portions. Thereby, the total area of the board can be reduced as compared with a rectangular board having the same width as that of each of the arranging portions over the whole length, and cost reduction can be realized. From the above, material cost of the board can also be reduced in addition to reduction of handling cost, and cost reduction can be greatly realized as a whole.

BRIEF DESCRIPTION OF THE DRAWINGS

FIG. 16 is a sectional view illustrating an enlarged circumference of the LED in a state where the liquid crystal display device is cut along a long-side direction thereof.

BEST MODE FOR CARRYING OUT THE INVENTION

First Embodiment

(1) Configuration

A first embodiment of the present invention will be described with reference to FIGS. 1 to 10. In the present embodiment, an X-axis, a Y-axis, and a Z-axis are shown in a part of each of the drawings. Directions of the axes are drawn to be set to directions shown in each of the drawings. An upper side shown in FIGS. 4 and 5 corresponds to a front side. A lower side thereof corresponds to a rear side.

Figure 1:
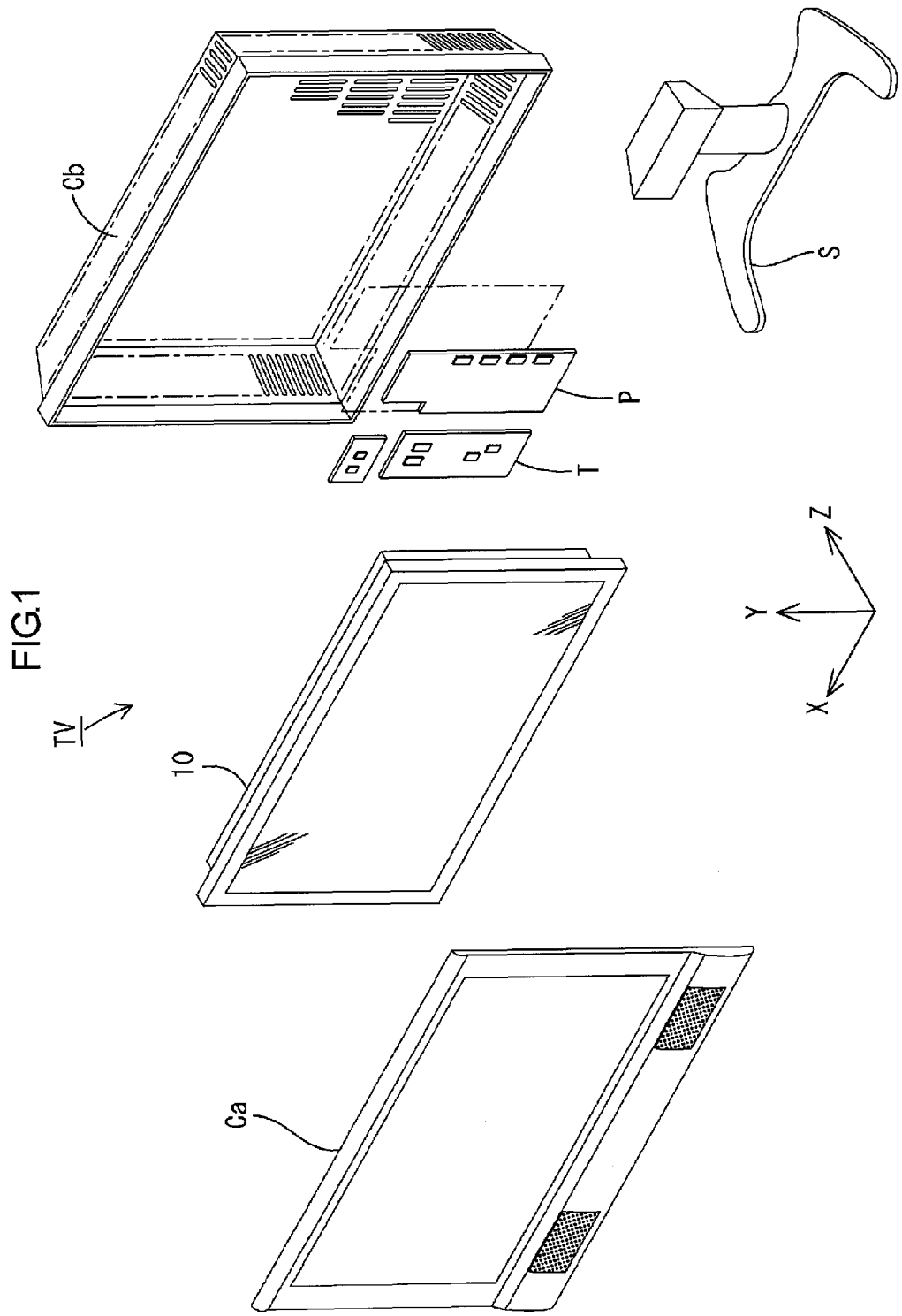
FIG. 1 is an exploded perspective view illustrating a configuration of a television receiver according to a first embodiment of the present invention.
Figure 2:
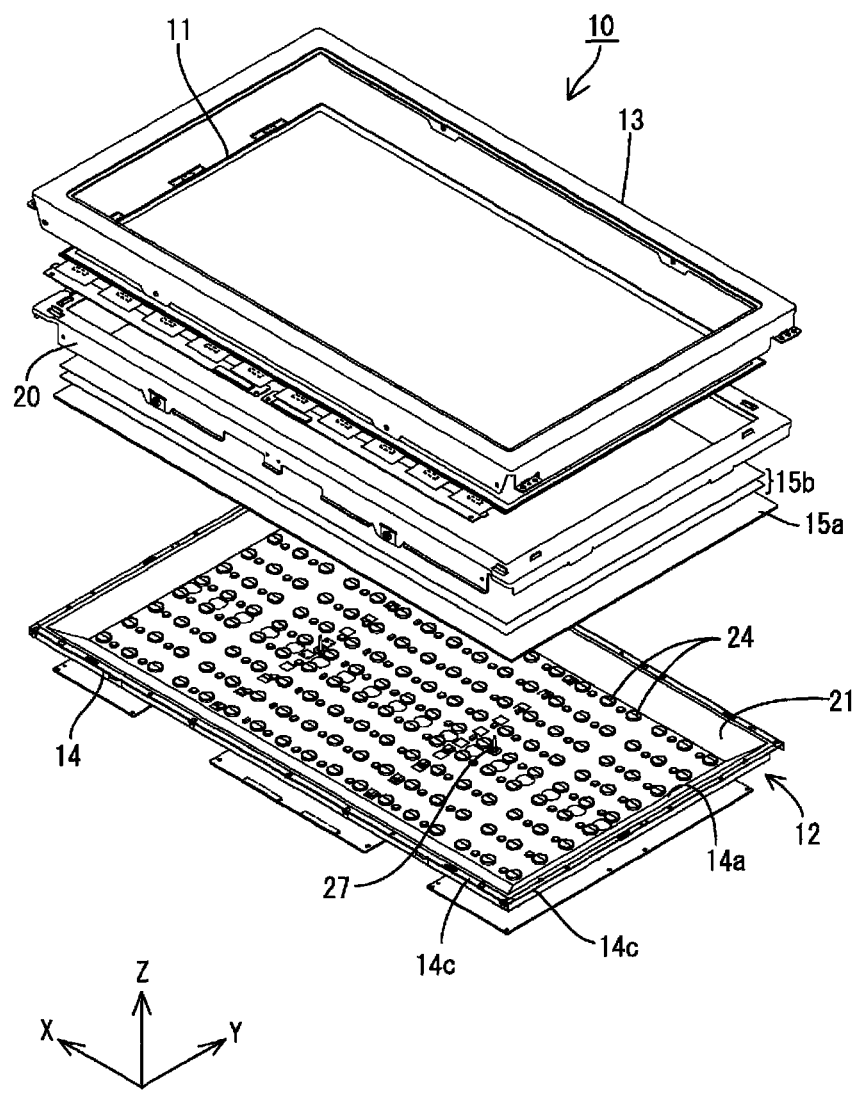
FIG. 2 is an exploded perspective view illustrating a schematic configuration of a liquid crystal display device.

As illustrated in FIG. 1, a television receiver TV of the present embodiment includes a liquid crystal display device 10 (display device), front and rear cabinets Ca, Cb which house the liquid crystal display device 10 therebetween, a power source P, and a tuner T. The television receiver TV is supported by a stand S such that a display surface thereof matches a vertical direction (Y-axis direction). An entire shape of the liquid crystal display device 10 is a landscape rectangular. As illustrated in FIG. 2, the liquid crystal display device 10 includes a backlight unit 12 (lighting device) which is an external light source, and a liquid crystal panel 11 (display panel) configured to provide display using light from the lighting device 12. The liquid crystal panel 11 and the backlight unit 12 are integrally held by a frame shaped bezel 13 and the like.

Next, the liquid crystal panel 11 and the backlight unit 12 included in the liquid crystal display device 10 will be described. Of these, the liquid crystal panel 11 has a rectangular shape in a plan view. The liquid crystal panel 11 is configured such that a pair of glass substrates is bonded together with a predetermined gap therebetween and liquid crystal is enclosed between the glass substrates. One of the glass substrates is provided with switching elements (for example, TFTs) connected to source lines and gate lines that are perpendicular to each other, pixel electrodes connected to the switching elements, an alignment film, and the like. The other substrate is provided with a color filter having color sections such as R (red), G (green) and B (blue) color sections arranged in a predetermined pattern, counter electrodes, and an alignment film. Outer surfaces of the glass substrates have polarizing plates attached thereto.

Figure 3:
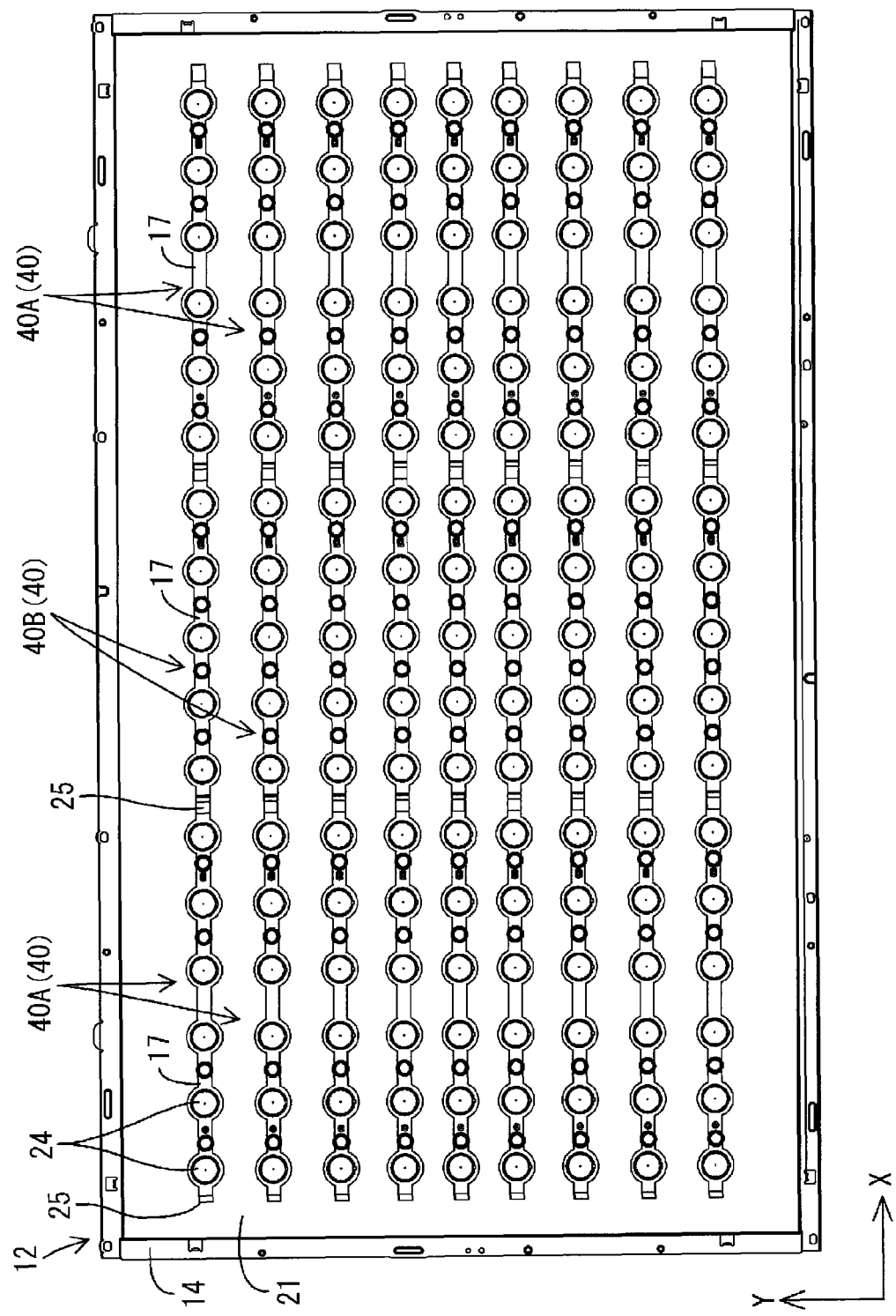
FIG. 3 is a plan view of a backlight unit.

Then, the backlight unit 12 will be described in detail. As illustrated in FIGS. 2 and 3, the backlight unit 12 includes a chassis 14 having a substantially box-shape and having an opening toward the front side (the liquid crystal panel 11 side, the light output side), a plurality of light source units 40 attached to the chassis 14, a reflection sheet (hereinafter, referred to as a chassis-side reflection sheet 21) covering a front side of the chassis 14, a diffuser 15a provided to cover the opening of the chassis 14, and a plurality of optical sheets 15b (two in the present embodiment) laminated on a front side of the diffuser 15a.

Figure 4:
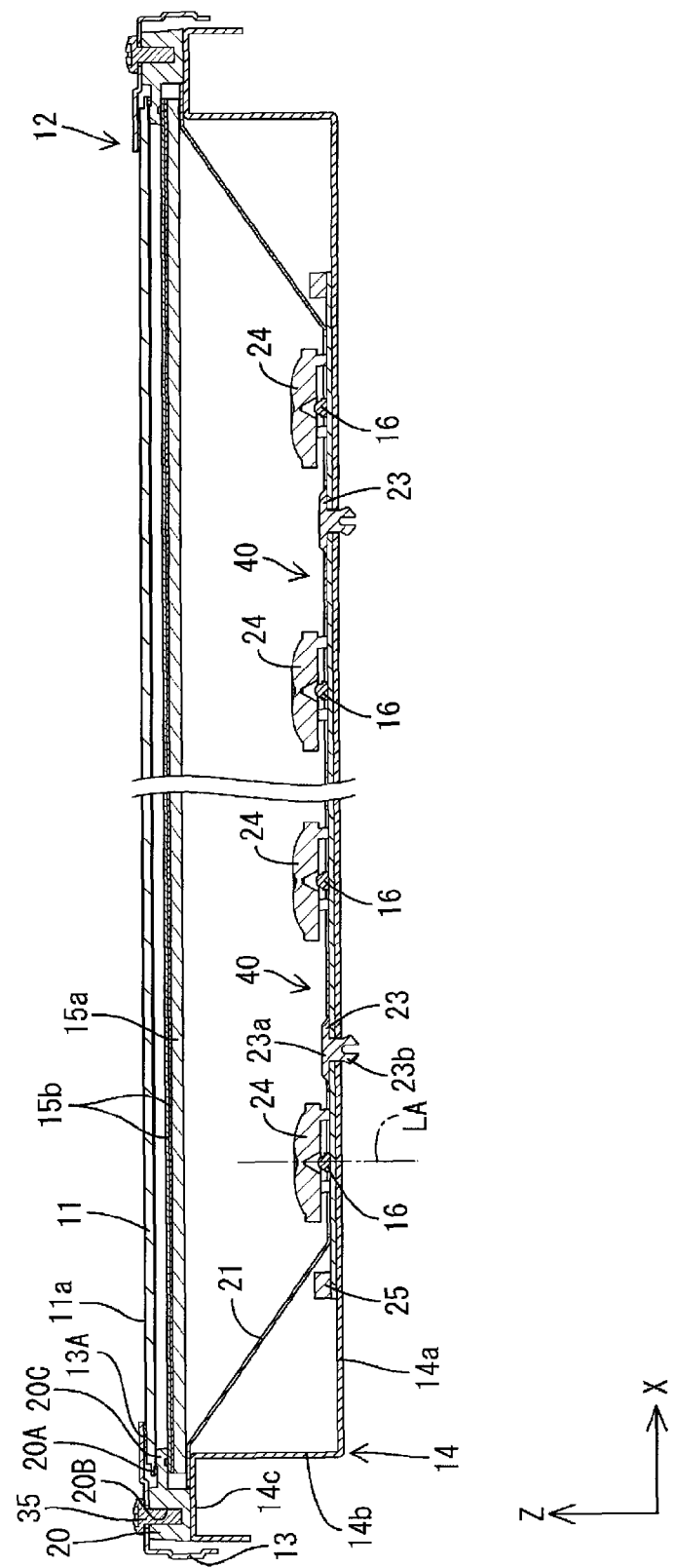
FIG. 4 is a sectional view illustrating a state where the liquid crystal display device is cut along a long-side direction thereof.

The chassis 14 is made of metal. As illustrated in FIGS. 3 and 4, the chassis 14 includes a rectangular bottom plate 14a like the liquid crystal panel 11, side plates 14b each of which rises from an outer edge of the corresponding side of the bottom plate 14a, and receiving plates 14c outwardly overhanging from a rising edge of each of the side plates 14b. An entire shape of the chassis 14 is a rectangular shape in a plan view, and a substantially shallow box shape (approximately shallow dish shape) opened to the front side. A longitudinal direction of the chassis 14 is aligned with a horizontal direction (X-axis direction), and a short-side direction thereof is aligned with the vertical direction (Y-axis direction).

The chassis-side reflection sheet 21 is made of a synthetic resin, for example. A surface of the chassis-side reflection sheet 21 is colored white, which has excellent reflectivity. The chassis-side reflection sheet 21 is laid so as to cover substantially the whole area of the bottom plate 14a and inner surface sides of the side plates 14b of the chassis 14. The chassis-side reflection sheet 21 has through holes 21A in places corresponding to diffusion lenses 24 of each of the light source units 40 to be described later (see FIG. 6). A size (inner diameter R1) of each of the through holes 21A in a plan view is set to be greater than an outer diameter (R2 of FIG. 6) of each of the diffusion lens 24. This prevents the chassis-side reflection sheet 21 from interfering with the diffusion lens 24 while a slight error (for example, an error of a size or a place of forming a hole) is tolerated when each of the through holes 21A is formed. As a result, the chassis-side reflection sheet 21 can be laid on an inner surface of the bottom plate 14a.

Figure 5:
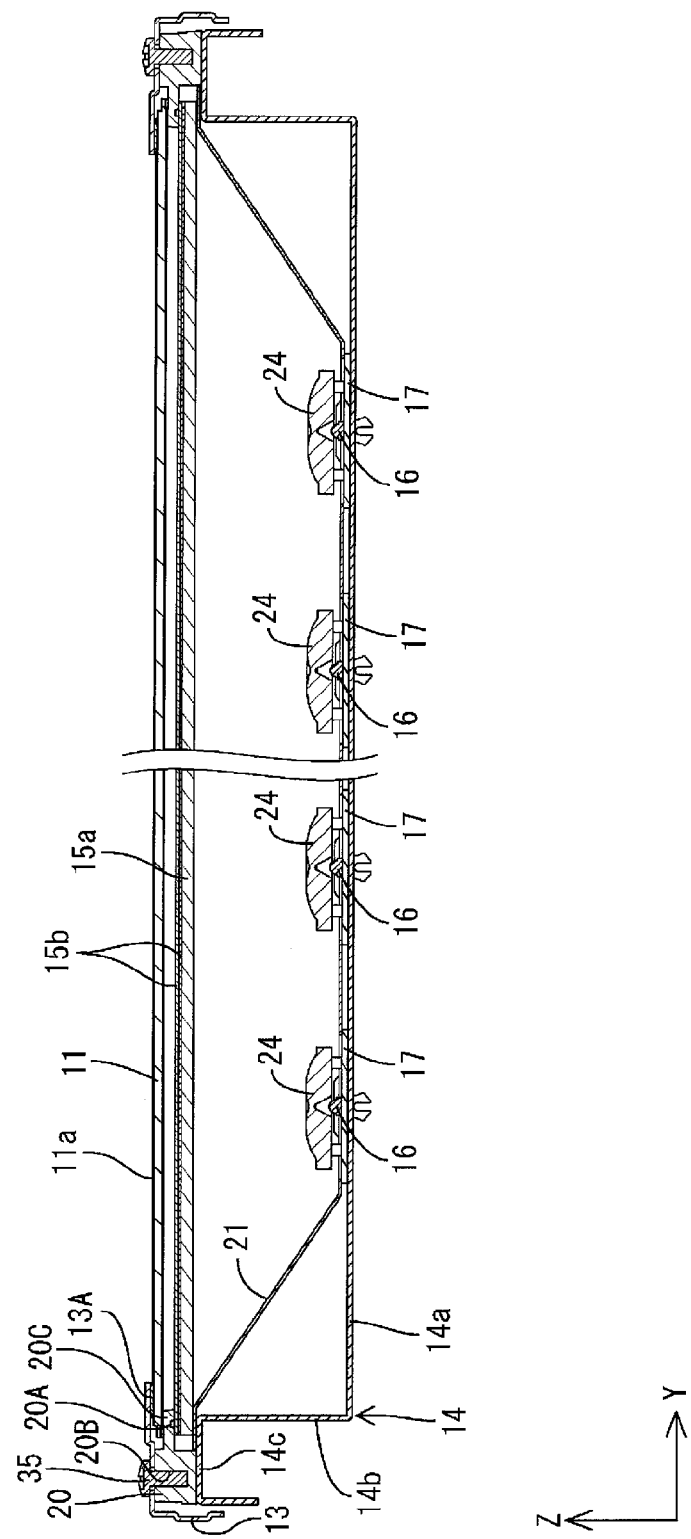
FIG. 5 is a sectional view illustrating a state where the liquid crystal display device is cut along a short-side direction thereof.
Figure 6:
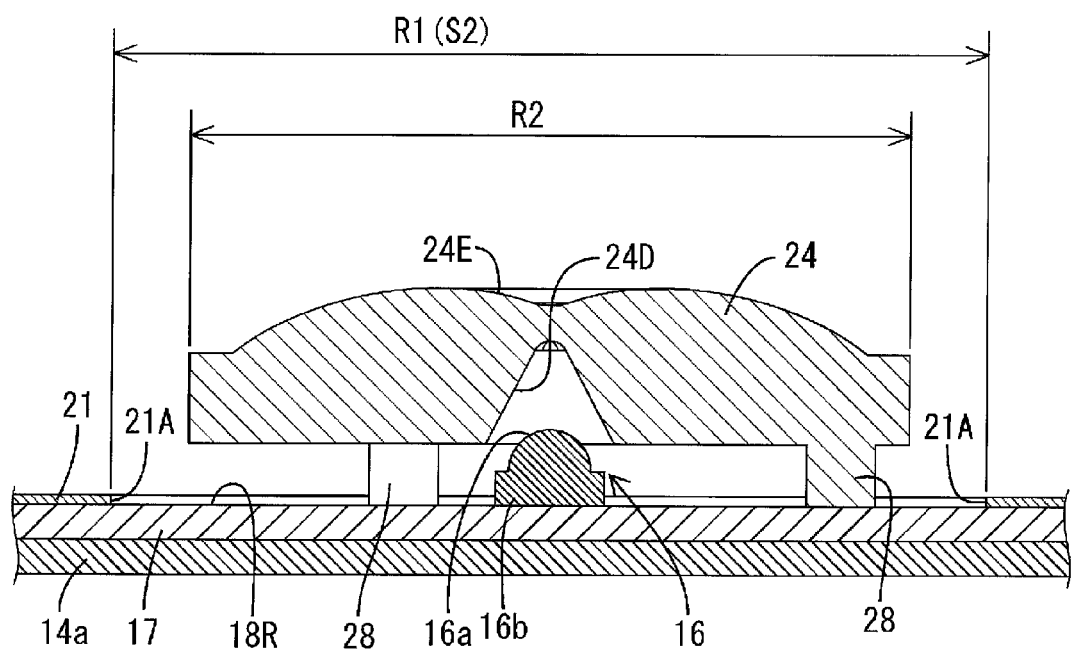
FIG. 6 is a sectional view illustrating an enlarged circumference of an LED in FIG. 4.

The chassis-side reflection sheet 21 is obliquely inclined in a periphery portion of the bottom plate 14a, and covers inner surfaces of the side plates 14b. As illustrated in FIGS. 4 and 5, a periphery portion of the chassis-side reflection sheet 21 is supported by the receiving plates 14c of the chassis 14. Light emitted from LEDs 16 of the light source units 40 can be reflected to the diffuser 15a side by the chassis-side reflection sheet 21, and thereby a brightness of the backlight unit 12 can be increased. FIG. 3 illustrates a state where the chassis-side reflection sheet 21 is removed.

The diffuser 15a has numerous diffusing particles dispersed in a transparent resin base material having a predetermined thickness, and has a function to diffuse transmission light. A plate thickness of each of the optical sheets 15b is thinner than a thickness of the diffuser 15a. A diffuser sheet, a diffusion lens sheet, and a reflection type polarizing sheet and the like are used as the optical sheets 15b, and can be suitably selected and used.

The diffuser 15a has a periphery portion superposed on the front side of the periphery portion of the chassis-side reflection sheet 21. Each of the receiving plates 14c of the chassis 14 has a frame 20 placed from the front side thereon. The frame 20 has a protruding portion 20C protruding to an inner side of the chassis 14. The protruding portion 20C can press a periphery portion of the optical sheets 15b from the front side. The chassis-side reflection sheet 21, the diffuser 15a, and the optical sheets 15b are sandwiched between the receiving plates 14c of the chassis 14 and the frame 20 by the above configuration. The protruding portion 20c of the frame 20 has a periphery portion of the liquid crystal panel 11 placed on the front side thereof through a buffer member 20A. The frame 20 has an attaching hole 20B thereon to fix the bezel 13 to the attaching hole 20B with a screw 35. Thereby, the liquid crystal panel 11 is pressed from the front side through the buffer member 13A by the bezel 13, and the liquid crystal panel 11 can be sandwiched between the frame 20 and the bezel 13.

The light source unit 40 includes a plurality of LEDs 16 (Light-emitting diode) which is a light source, an LED board 17 on which the plurality of LEDs 16 is mounted on a straight line, and the diffusion lenses 24 provided on the LED board 17. The present embodiment includes two kinds of light source units 40 in which the number of the LEDs 16 and a length of the X-axis direction are different. Specifically, as illustrated in FIG. 3, the present embodiment includes the light source unit 40 (hereinafter, referred to as a light source unit 40A) on which the six LEDs 16 are mounted, and the light source unit 40 (hereinafter, referred to as a light source unit 40B) on which the five LEDs 16 are mounted. The seventeen LEDs 16 are arranged in total in the X-axis direction on the chassis 14 by connecting the light source unit 40A, the light source unit 40B, and the light source unit 40A in this order in the X-axis direction. The light source units 40 aligned in the X-axis direction are electrically connected through connectors 25 to be described later. The connected light source units 40A and 40B are arranged in a plurality of rows (nine rows in the present embodiment) with a predetermined interval in a short direction of the chassis 14 (Y-axis direction). Thereby, the plurality of light source units 40, consequently, the plurality of LEDs 16 is two-dimensionally arranged on the chassis 14.

As described above, the LEDs 16 are arranged by combining the two kinds of light source units 40A and 40B. Change of combination of the light source units 40A and 40B can correspond to the liquid crystal display devices 10 and the backlight units 12 having different screen sizes. This may not require preparation an LED board having an exclusive length corresponding to each of sizes of the liquid crystal display devices 10 and the backlight units 12. Thus, this can reduce the kind of the LED board, and can reduce cost. In addition to the above-mentioned two kinds of light source units 40A and 40B, the light source units 40 having different number of the LEDs 16 may be combined. For example, three kinds of light source units of the light source units 40A and 40B and a light source unit 40 (not illustrated) on which the eight LEDs 16 are mounted are suitably combined, and the three kinds of light source units are attached to the chassis 14. Thereby, this configuration can correspond to the liquid crystal display devices 10 and the backlight units 12 which have different screen sizes such as 26 inches, 32 inches, 37 inches, 40 inches, 42 inches, 46 inches, 52 inches, and 65 inches.

Next, components of the light source units 40 will be described. As described above, in the present embodiment, the light source unit 40A on which the six LEDs 16 are mounted, and the light source unit 40B on which the five LEDs 16 are mounted are exemplified as the light source units 40. However, because the light source unit 40A has the same configuration as that of the light source unit 40B except for the number of the LEDs 16 to be mounted (in other words, the number of arranging portions 18), only the light source unit 40A will be described.

The LEDs 16 are so-called surface mounting type LEDs, and are mounted on a front side surface of the LED board 17. Each of the LEDs 16 includes a body portion 16b and a tip portion 16a having a semispherical shape. An optical axis LA of the LED 16 is coaxial to the Z-axis. Each of the LEDs 16 is obtained by combining an LED chip emitting blue single color light with a fluorescent material, to emit white color light. A rear surface of the body portion 16b of each of the LEDs 16 is soldered to a land of the LED board 17.

Figure 8:
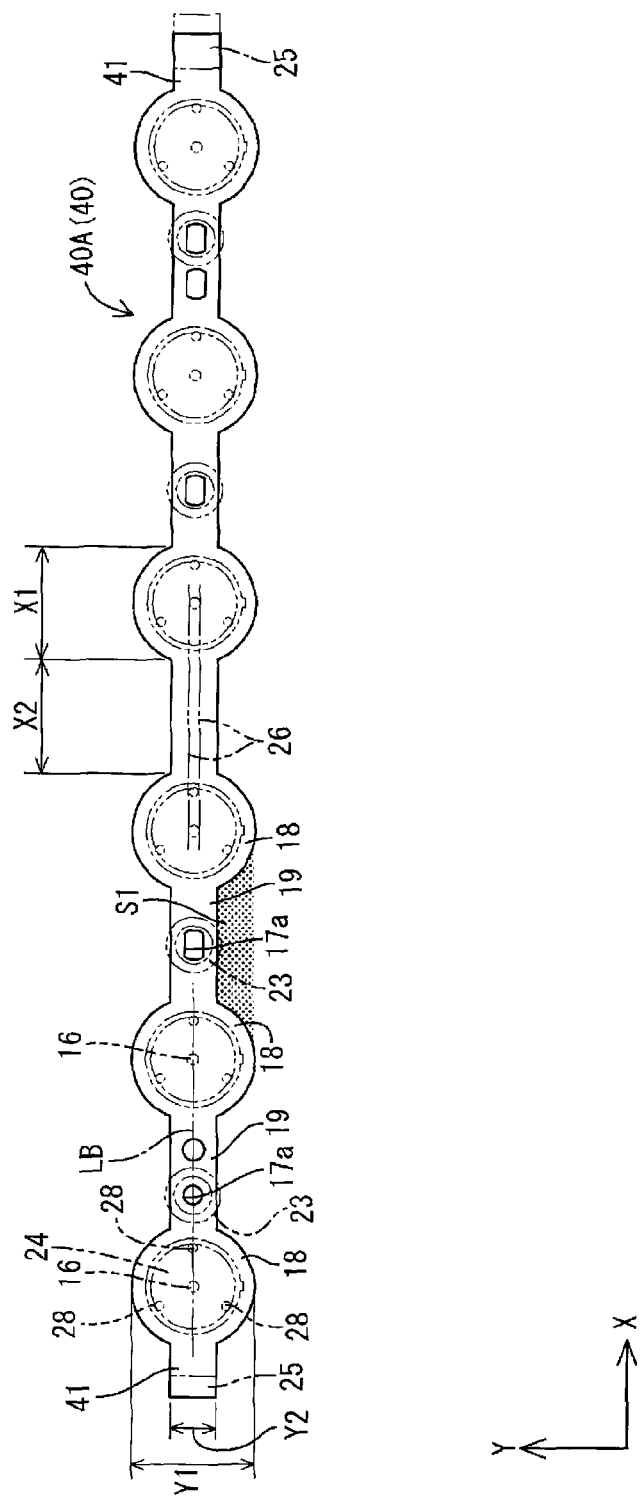
FIG. 8 is a plan view of an LED board.

For example, a copper clad laminate obtained by sticking a copper foil on a glass-epoxy substrate (FR-4) is used as the LED board 17. As illustrated in FIGS. 3 and 8, the LED board 17 has an elongated shape along the longitudinal direction of the chassis 14, and has a 180-degree rotationally symmetric shape. The LED board 17 includes a plurality of arranging portions 18 on which LEDs 16 are arranged (mounted), a plurality of connecting portions 19 connecting the adjacent arranging portions 18, and connector attaching portions 41 extending in an X-axis direction from the arranging portions 18 located on both end sides in a longitudinal direction. The connectors 25 are attached to the connector attaching portions 41. Each of the LED boards 17 has an external control unit (not illustrated) connected thereto. Electrical power required for lighting each of the LEDs 16 can be supplied from the control unit, and each of the LEDs 16 can be driven and controlled.

Figure 7:
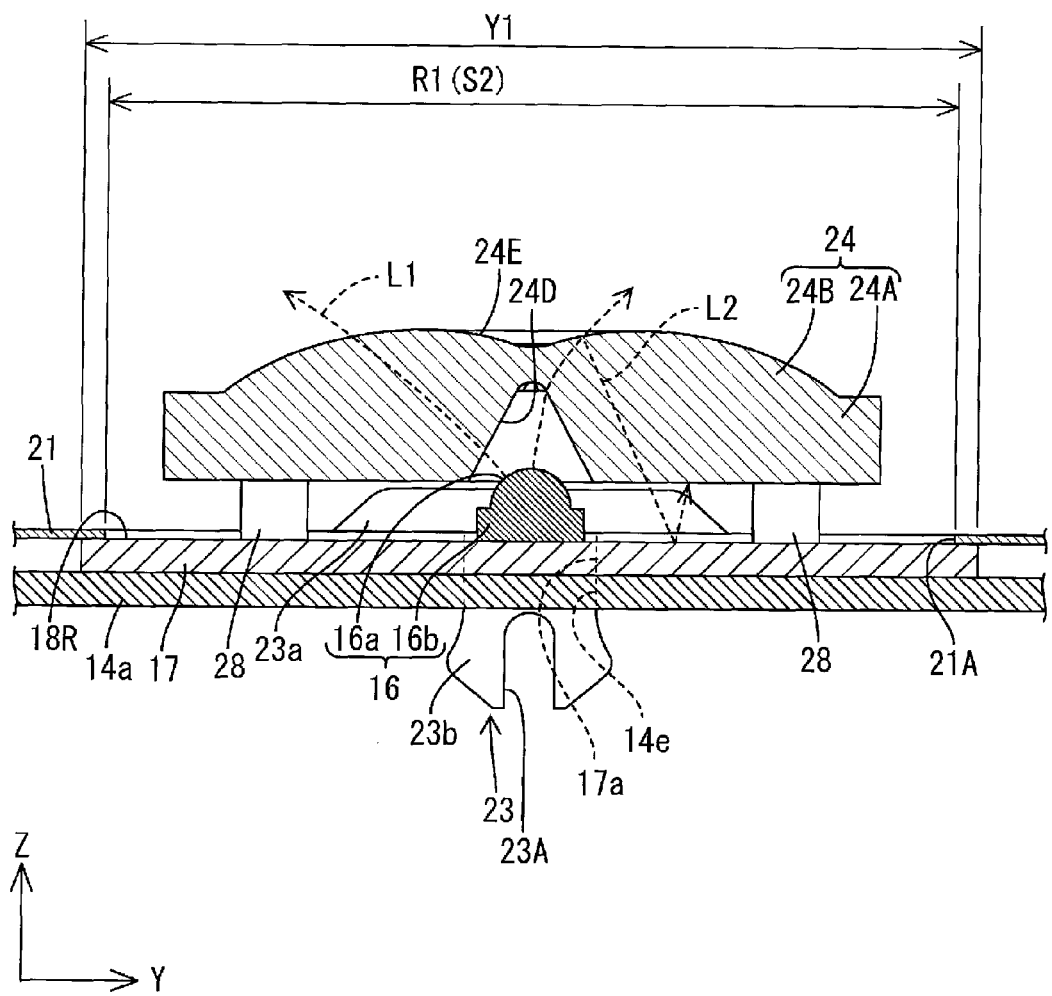
FIG. 7 is a sectional view illustrating an enlarged circumference of an LED in FIG. 5.

The LED board 17 has attaching holes 17a formed in the predetermined connecting portions 19 thereof. A clip 23 for fixing each of the LED boards 17 to the chassis 14 is inserted into each of the attaching holes 17a. The chassis 14 has attaching holes 14e having the same diameter as each of the attaching holes 17a formed in places corresponding to the attaching holes 17a. The clip 23 is made of a synthetic resin, for example. As illustrated in FIG. 7, the clip 23 includes an attaching plate 23a which is parallel to the LED boards 17, and an inserting portion 23b protruding from the attaching plate 23a to the chassis 14 side along a plate thickness direction (Z-axis direction) of each of the LED boards 17.

The inserting portion 23b is set such that a base end side diameter thereof is slightly smaller than that of each of the attaching holes 17a, and is set such that a tip side diameter thereof is greater than that of each of the attaching holes 17a. The inserting portion 23b has a groove portion 23A having a shape denting to the front side formed in a tip portion thereof. Thereby, the tip portion of the inserting portion 23b can be elastically deformed in a radial direction. When the inserting portion 23b of the clip 23 is inserted into each of the attaching holes 17a and each of the attaching holes 14e, a tip side of the inserting portion 23b is locked from the rear side of each of the attaching holes 17a by the above configuration. Thereby, each of the LED boards 17 is fixed to the chassis 14 by the clip 23.

As illustrated in FIG. 2, support pins 27 are provided to protrude to the front side from surfaces of the clips 23 located near a center of the chassis 14. When the diffuser 15a bends, the support pins 27 supports the diffuser 15a from the rear side, thereby functioning to suppress bending of the diffuser 15a.

Each of the diffusion lenses 24 is formed of a transparent member (for example, acrylic and polycarbonate) having a refractive index higher than that of air. Each of the diffusion lenses 24 functions to refract light emitted from the LEDs 16 to diffuse the light. Each of the diffusion lenses 24 has a circular shape in a plan view, and includes the LED 16 at a center thereof. The diffusion lenses 24 are provided on the arranging portion 18 so as to cover the front side (tip portion 16a side) of the LEDs 16. Each of the diffusion lenses 24 includes a base portion 24A having a circular plate shape in a plan view and a flat spherical portion 24B having a flat semi-spherical shape. As illustrated in FIGS. 7 and 8, each of the diffusion lenses 24 has three leg portions 28 protruding to the rear side near a periphery portion thereof. The three leg portions 28 are arranged at substantially equal intervals (intervals of about 120 degrees) from a center part of the diffusion lens 24 in a plan view (illustrated by dashed lines of FIG. 8). For example, the three leg portions 28 are bonded to the arranging portion 18 by an adhesive or a thermosetting resin and the like.

Each of the diffusion lenses 24 has a concave portion 24D having a substantially conical shape formed in a lower surface thereof by denting a place located immediately above each of the LEDs 16 to the front side (upper side of FIG. 7). Each of the diffusion lenses 24 has a concave portion 24E having an substantially mortar shape formed in a top portion thereof. An inner peripheral surface of the concave portion 24E has a circular arc shape in a section view. As illustrated in FIG. 7, the light from each of the LEDs 16 is refracted over a wide angle on a boundary between each of the diffusion lenses 24 and air by the above configuration, and is diffused to circumference of each of the LEDs 16 (light ray L1). A part of the light is reflected on a boundary between the concave portion 24E of each of the diffusion lenses 24 and air (light ray L2). Thereby, a phenomenon in which the top portion of each of the diffusion lenses 24 is brighter than circumference thereof can be prevented, and uneven brightness can be suppressed.

The LED board 17 has a front surface on which a reflection surface 18R for reflecting light to the front side is formed. The reflection surface 18R is formed by printing a paste containing an metal oxide on the surface of the LED board 17. The paste can be printed by, for example, screen printing, ink jet printing or the like.

Next, a shape of the LED board 17 will be described. The arranging portion 18 has a circular shape in a plan view. The arranging portion 18 has a diameter Y1 greater than an outer diameter R2 of the diffusion lens 24 and the diameter R1 of the through hole 21A. Thus, the arranging portion 18 is provided in the substantially whole area of a region S2 corresponding to the through hole 21A in a plan view (a state viewed from the upper side of FIG. 7). Therefore, when light reflected from the diffusion lens 24 or the optical sheet 15b is made incident on the region S2 (in other words, a region which is not covered with the chassis-side reflection sheet 21), the light can be reflected to the diffuser 15a side by the reflection surface 18R again, and a brightness can be increased. The arranging portions 18 are arranged at constant intervals along the X-axis direction, and the LED 16 is mounted at the center of each arranging portion 18. Thereby, the LEDs 16 are arranged at equal intervals along the longitudinal direction of the LED board 17.

The connecting portion 19 has a rectangular shape elongated in the X-axis direction (a longitudinal direction of the LED board 17). Each of the connecting portions 19 has a width Y2 in the short-side direction (Y-axis direction, the short direction of the LED board 17) narrower than a diameter Y1 (a width in the Y-axis direction) of each of the arranging portions 18 (see FIG. 8). All length in the X-axis direction of the connecting portions 19 are the same length. The connector attaching portion 41 has the same width as that of each of the connecting portions 19 in the Y-axis direction. Each of the connector attaching portions 41 has a length in the X-axis direction smaller than a length of each of the connecting portions 19.

The connecting portions 19 are provided on a straight line connecting centers of the adjacent arranging portions 18, in other words, on a straight line (a straight line LB of FIG. 8) connecting the LEDs 16. The arranging portions 18 and the connecting portions 19 have wirings 26 formed on rear surfaces thereof. The wirings 26 are formed to electrically connect the lands of the arranging portions 18, and supply electrical power to the LEDs 16. The wirings 26 are formed by, for example, pattern printing on each of the LED boards 17. The wirings 26 are arranged in the connecting portions 19 along the longitudinal direction except for places of forming the attaching holes 17a in each of the LED boards 17. That is, the wirings 26 are arranged on a straight line (in other words in the shortest route) on the LED boards 17. Only a part of the wirings 26 is illustrated in FIG. 8 (two-dot chain lines in FIG. 8).

(2) Method of Manufacturing LED Boards

Figure 9:
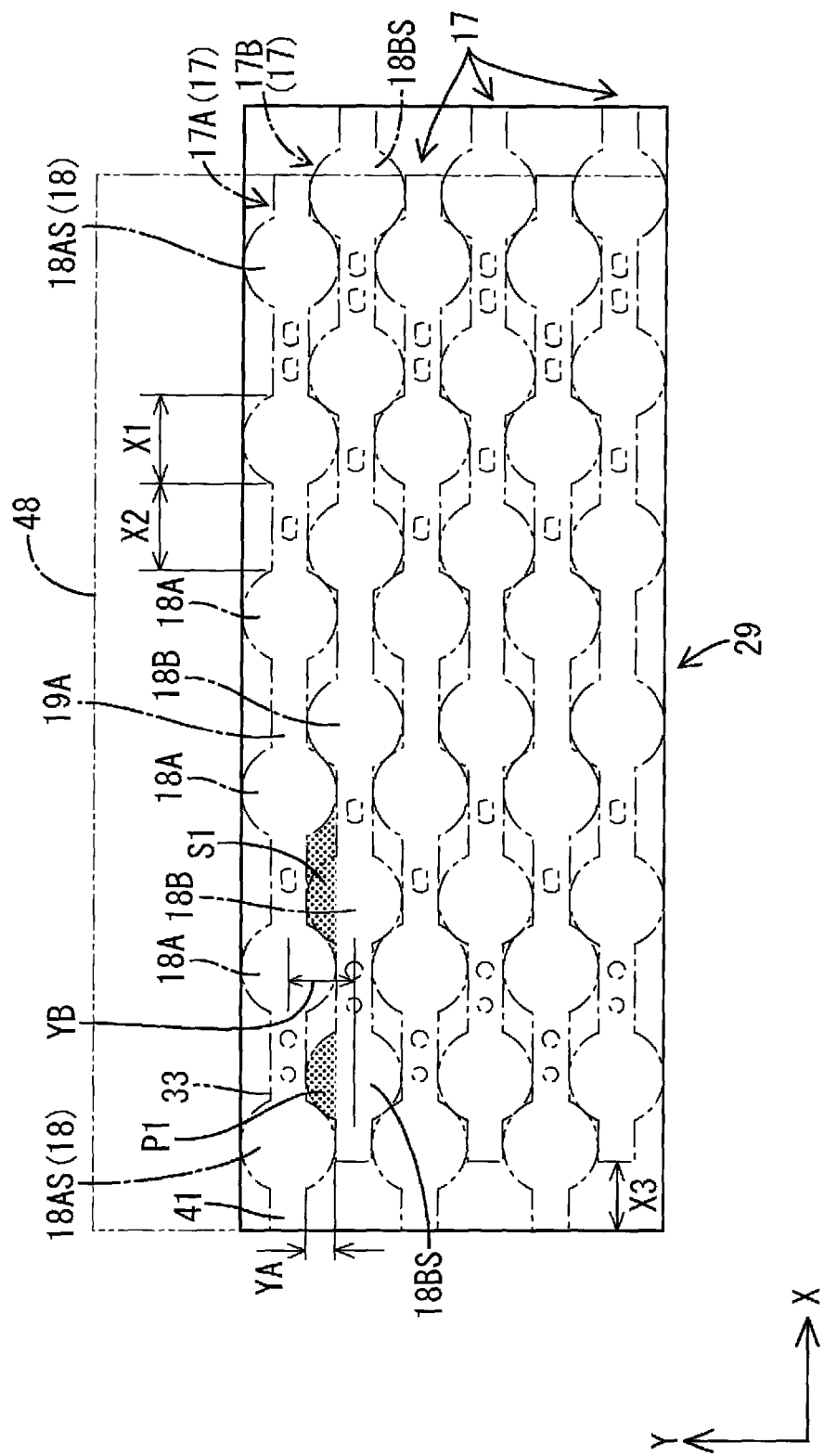
FIG. 9 is a plan view illustrating a method for manufacturing LED boards.

Next, a method of manufacturing the LED boards 17 (boards for a light source unit) of the present embodiment will be described. In the present embodiment, as illustrated in FIG. 9, a plurality of LED boards 17 (six in FIG. 9) is manufactured by dividing one board base material 29 having a rectangular shape. First, a method of allotting the LED boards 17 to the board base material 29 will be described. The plurality of LED boards 17 are arranged on the board base material 29 such that longitudinal directions of the LED boards 17 are aligned to each other. At this time, the LED boards 17 are adjacent to each other in the Y-axis direction. In this configuration, the LED boards 17 are arranged such that the LED boards 17 of even number of stages are shifted to the LED boards 17 of odd number of stages in the longitudinal direction (X-axis direction) of the LED board 17. The LED board 17 of the first stage (a first board) (the top stage in FIG. 9) and the LED board 17 of the second stage (a second board) adjacent thereto will be described as examples. For the purposes of illustration, the LED board 17 of the top stage is designated by symbol 17A, and the LED board 17 of the second stage is designated by symbol 17B.

The LED board 17B is shifted to the LED board 17A in the X-axis direction (shift amount X3). Thereby, the LED board 17A and the LED board 17B are arranged such that each arranging portion 18 of the LED board 17B (hereinafter, arranging portions 18B) is fitted between the adjacent arranging portions 18 of the LED board 17A (hereinafter, arranging portions 18A). That is, the LED board 17 has an outer shape such that the arranging portion 18B of the LED board 17B is fitted between the adjacent arranging portions 18A of the LED board 17A. As illustrated in FIG. 9, in this context, the fitting means a state where at least a part of the arranging portion 18B is arranged in a part of a region S1 (a hatching pattern of FIG. 9) whose three sides are surrounded by the adjacent arranging portions 18A and a connecting portion 19 (hereinafter, referred to as a connecting portion 19A) connecting the arranging portions 18A. The LED boards 17 of the third and subsequent stages are also allotted on the board base material 29 as in arrangement of the LED boards 17A and 17B.

As described above, the LED boards 17A and 17B are allotted on the board base material 29. Therefore, a length of the board base material 29 in the Y-axis direction can be decreased as compared with a case (FIG. 11) where rectangular LED boards 37 are formed by dividing one board base material 48. The LED board 37 has a width in the Y-axis direction as the same width as the width Y1 of the arranging portion 18 over the whole length. Therefore, an area of the board base material when the LED boards of the same number are formed can be decreased, and cost can be decreased. In order to compare an area of the board base material 29 with an area of the board base material 48 in FIG. 9, the area of the board base material 48 is illustrated by two-dot chain lines.

Figure 11:
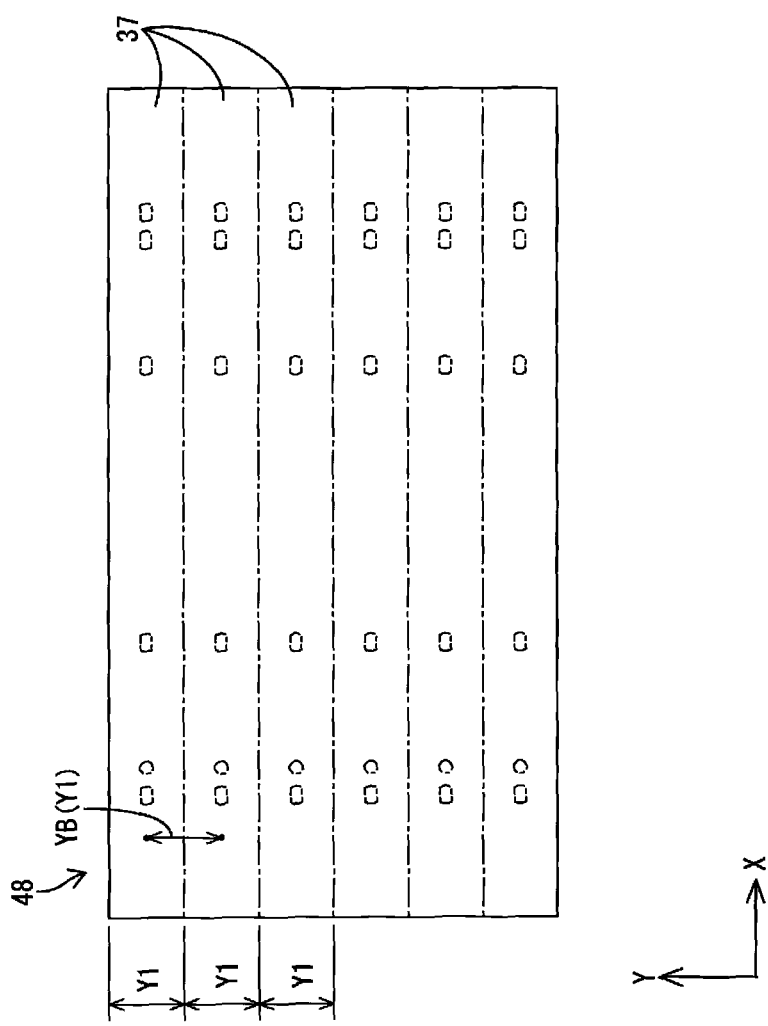
FIG. 11 is a plan view illustrating comparative example of the LED boards.

A method for allotting the LED boards 17 in the board base material 29 will be further described in detail. The connecting portion 19 of the LED board 17 has a length X2 in the X-axis direction is preferably greater than a length X1 of the arranging portion 18. Thus, as illustrated in FIG. 9, the whole area of a portion P1 (a portion protruding in the Y-axis direction from the connecting portion 19 in the arranging portion 18B) of the arranging portion 18B can be put in the region S1 whose three sides are surrounded by the adjacent arranging portions 18A and the connecting portions 19A connecting the arranging portions 18A. As a result, the arranging portion 18B and the connecting portion 19A can be arranged in a state where they abut on or are brought close to each other. That is, as illustrated in FIG. 11, a distance YB between centers of the arranging portions 18A and 18B can be decreased by YA (a value obtained by dividing a difference between a width of the arranging portion 18 and a width of the connecting portion 19 in the Y-axis direction by 2) as compared with a case where the LED boards 37 having a constant width are provided over the whole length. When the number of the LED boards 17 formed from one board base material 29 is defined as N, a length in the Y-axis direction of the board base material 29 can be decreased by YA×(N−1) as compared with the method for allotting the LED boards of FIG. 11.

Figure 10:
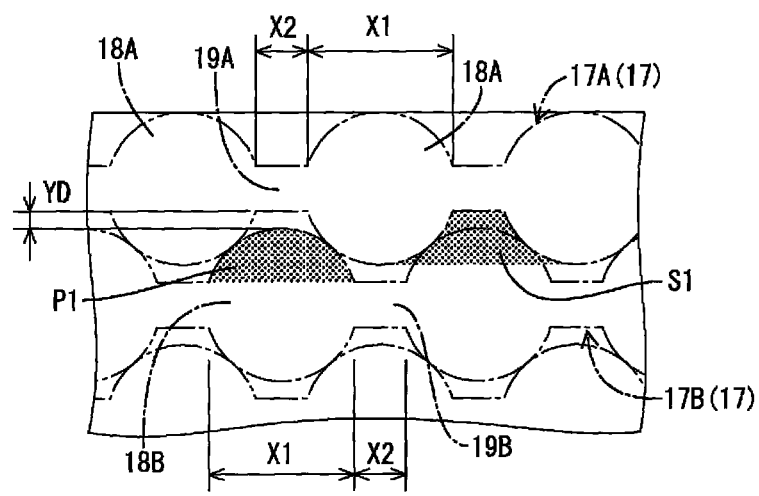
FIG. 10 is a view schematically illustrating comparative example regarding a method for allotting the LED boards.

The length X2 of the connecting portion 19 is supposedly defined to be smaller than the length X1 of the arranging portion 18. As illustrated in FIG. 10, when the arranging portion 18B is fitted between the adjacent arranging portions 18A in this case, the portion P1 protruding from the connecting portion 19 in the Y-axis direction is partially put in the region S1. That is, even when the arranging portion 18B and the connecting portion 19A are brought close to each other as much as possible, they cannot abut on each other, which produces an interval YD therebetween.

On the other hand, because the arranging portion 18B and the connecting portion 19A can be arranged to abut on or be brought close to each other in the present embodiment, the interval YD shown in FIG. 10 can be minimized (almost zero). Thereby, a length in the Y-axis direction of the board base material 29 can be decreased as much as possible.

The arranging portions 18A located on both end sides in a longitudinal direction of the LED board 17A are referred to as arranging portions 18AS. The arranging portions 18B located on both end sides in a longitudinal direction of the LED board 17B are referred to as arranging portions 18BS. In this case, as illustrated in FIG. 9, a shift amount X3 of the LED board 17B of the second stage in the X-axis direction is preferably set such that the arranging portion 18AS and the arranging portion 18BS abut on (or are brought close to) each other. Thus, a length in the X-axis direction of the board base material 29 can be decreased as compared with a case where the arranging portion 18BS abuts on (or brought close to) the arranging portion 18A (the second arranging portion 18A from the left in FIG. 9) adjacent to the arranging portion 18AS. As described above, length in the X-axis and the Y-axis of the board base material 29 can be decreased as much as possible by setting the length X1 of the arranging portion 18, the length X2 of the connecting portion 19, and the shift amount X3 in the X-axis direction. Therefore, the area of the board base material 29 can be minimized.

Next, circuit patterns are formed (the lands on which the LEDs 16 are mounted and the wirings 26 connecting the LEDs 16, and the like are formed), and printing on the reflection surface 18R is performed on the board base material 29 in which the plurality of LED boards 17 is allotted according to the above allotting method. The circuit patterns can be formed by an etching method and the like in the same procedure as that of manufacture of a usual printed-wiring board.

Next, perforations 33 corresponding to the outer shape of the LED board 17 are formed. The LEDs 16 and the connectors 25 are mounted on the LED board 17 in the board base material 29 in which the perforations 33 are formed (mounting step), by reflow soldering. For example, parts such as the LEDs 16 and the connectors 25 are mounted so as to correspond to the land on which cream solder is applied. Then, the parts are heated in a reflow furnace to melt the cream solder. Thereby, the LEDs 16 and the connectors 25 are electrically connected. Thus, the parts such as the LEDs 16 and the connectors 25 are mounted before cutting the board base material 29 along the perforations 33, and thereby the parts can be collectively mounted.

Next, the board base material 29 after the mounting step is cut along the perforations 33. Places in which the perforations 33 are not opened are cut by using jigs such as a Thomson die cutter. Thereby, the plurality of LED boards17 is divided from the board base material 29 (dividing step). The light source units 40 are completed by attaching the diffusion lenses 24 to the divided LED boards 17.

(3) Advantageous Effect

As described above, in the light source units 40 according to the present embodiment, the arranging portions 18 each of which each LED 16 is arranged on are connected by the connecting portions 19. Thereby, the LED 16 or the light source unit 40 itself has improved ease of handling, and for example, cost reduction can be achieved. The arranging portion 18 needs to have a certain width in order to arrange the LEDs 16. On the other hand, the connecting portion 19 connecting the arranging portions 18 may not necessarily have the same width as that of the arranging portion 18. In the present embodiment, the collateral connecting portion 19 has the width Y2 narrower than the width Y1 of the arranging portion 18 in the short direction of the LED board 17. Thereby, the total area of the LED board can be reduced as compared with a rectangular LED board having the same width Y1 as that of the arranging portion 18 over the whole length, and cost reduction can be realized. From the above, material cost of the LED board 17 can also be reduced in addition to reduction of handling cost, and cost reduction can be greatly realized as a whole.

The LED board 17 has the LEDs 16 arranged along a longitudinal direction thereof. The connecting portions 19 are arranged on a straight line connecting the plurality of LEDs 16. The connecting portion 19 has the wiring 26 supplying electric power to each LED 16 provided along the longitudinal direction of the LED board 17. Thus, the wiring 26 to each of the LEDs 16 can be linearly formed, that is, in the shortest route. Therefore, cost of the wiring 26 can be reduced, and consequently, cost reduction of the light source unit 40 can be realized.

The method for manufacturing the LED boards 17 according to the present embodiment includes dividing one board base material 29 to form the plurality of boards. The LED board 17 has an outer shape such that the arranging portion 18 of the LED board 17 can be fitted between the arranging portions 18 of the other LED board 17 having the same shape. Therefore, in the dividing step, the board base material 29 can divided such that the arranging portion 18 of other LED board 17B (the second board) is allotted between the adjacent arranging portions 18 in the LED board 17A (the first board). Thus, the area of the board base material 29 can be reduced, and cost can be reduced.

The connecting portion 19 has the length X2 in the longitudinal direction of the LED board 17 greater than the length X1 of the arranging portion 18. In such a configuration, in the manufacturing process of the LED boards 17, the LED boards 17 can be arranged such that the arranging portion 18B of the LED board 17B abuts on or is brought close to the connecting portion 19 connecting the arranging portions 18A of the LED board 17A when both the boards 17A and 17B are fitted. Therefore, the area of the board base material 29 can be reduced, and cost can be reduced.

The arranging portion 18 has the reflection surface 18R formed on the surface on which the LEDs 16 are arranged. Thus, the lights from the LEDs 16 can be reflected by the reflection surface 18R, and a brightness can be increased. Particularly, because the width of the arranging portion 18 is greater than that of the arranging portion 19 in the present embodiment, the lights from the LEDs 16 can be effectively reflected by forming the reflection surface 18R in the arranging portion 18.

The LEDs 16 are used as the light sources. Thus, power consumption can be suppressed.

The LED 16 is covered with the diffusion lens 24. Thus, the lights from the LEDs 16 is diffused by the diffusion lens 24. Thereby, a brightness can be uniformed while an arrangement interval between the LEDs 16 is increased (that is, while the number of the LEDs 16 is reduced). As a result, when a uniform brightness distribution is required, the number of the LEDs 16 can be reduced as compared with a case where the diffusion lenses 24 are not used, and cost can be reduced.

The chassis 14 has the rectangular shape in a plan view. The light source units 40 are arranged such that the longitudinal direction thereof is aligned with the long-side direction of the chassis 14. According to such a configuration, the total number of the light source units 40 can be decreased compared to a case where the longitudinal direction of the light source unit 40 is aligned with the short direction of the chassis 14. Therefore, for example, the number of control units for controlling lighting on and off of the LEDs 16 can be decreased, and thereby cost reduction can be realized.

Second Embodiment

Figure 12:
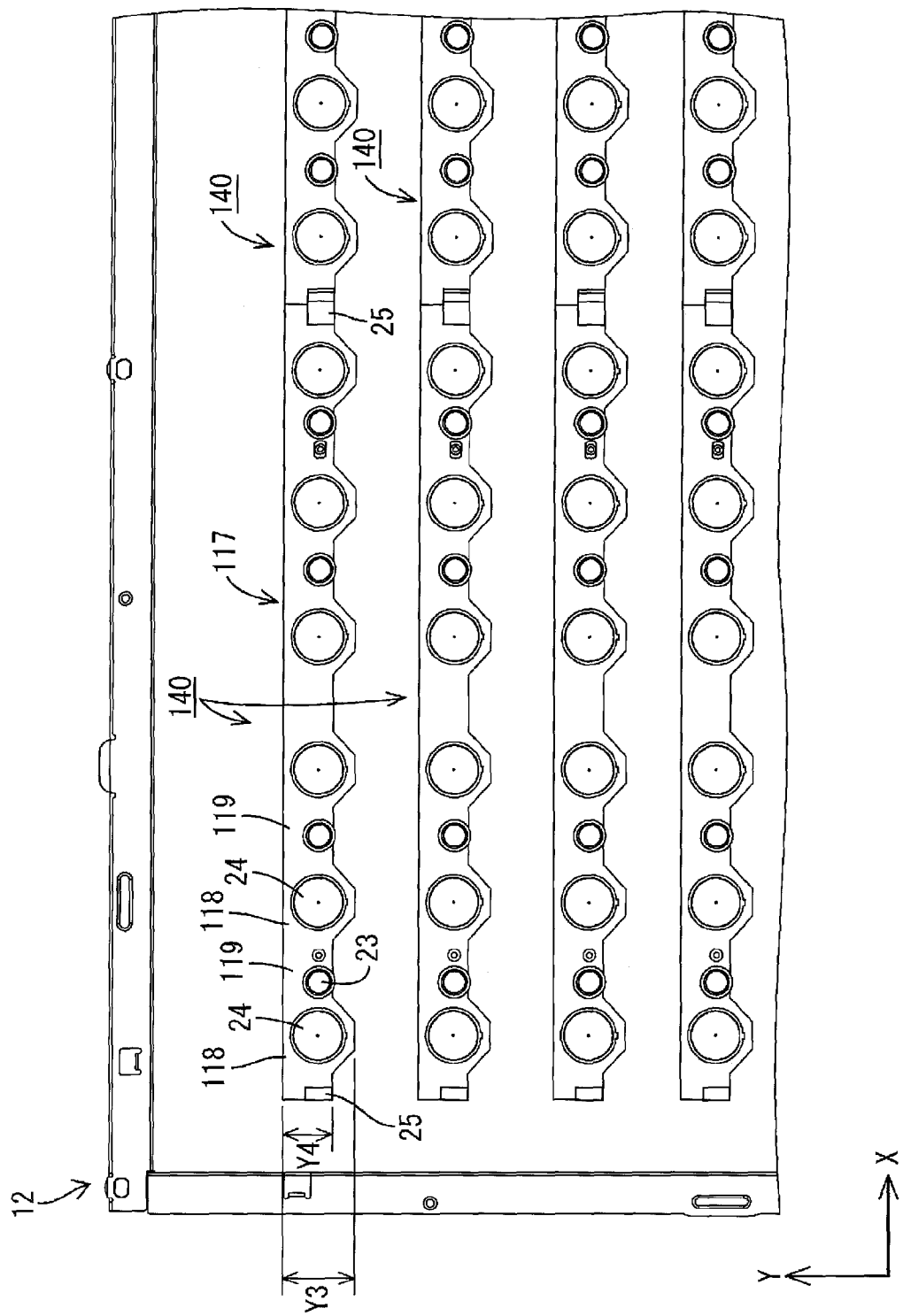
FIG. 12 is a plan view illustrating a light source unit according to a second embodiment of the present invention.
Figure 13:
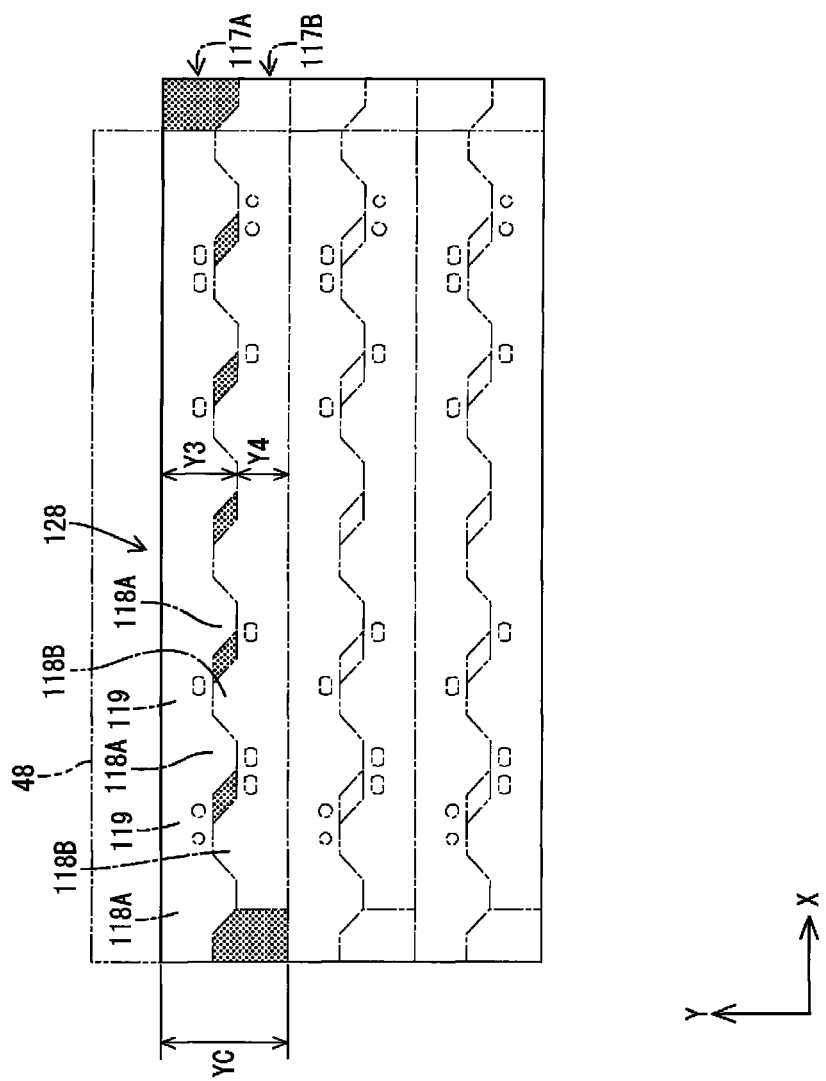
FIG. 13 is a plan view illustrating a method for manufacturing LED boards.

Next, a second embodiment of the present invention will be described with reference to FIGS. 12 to 13. An LED board in a light source unit 140 according to the second embodiment has a shape different from that of the first embodiment. In the second embodiment, constituent parts having the same names as those of the above first embodiment are indicated by the same symbols without repeating overlapping descriptions of structures, operations, and effects. As illustrated in FIG. 12, in an LED board 117 of the second embodiment, an arranging portion 118 has a substantially trapezoidal shape greater than the outer shape of the diffusion lens 24 in a plan view. The connecting portion 119 is decentered to one end side (an upper end side in FIG. 12) of a Y-axis direction. The arranging portions 118 and the connecting portions 119 of the LED board 117 make one plane on the one end side of the Y-axis direction. The LED board 117 of the first embodiment has a 180-degree rotationally symmetric shape. By contrast, the LED board 117 has an asymmetric shape in a vertical direction of FIG. 12. In a short direction, the connecting portion 119 has a width Y4 smaller than a width Y3 (a height of a trapezoid) of the arranging portion 118.

Next, a method for allotting the LED boards 117 in the board base material 128 when manufacturing the LED boards 117 will be described. FIG. 13 illustrates a state where a plurality of LED boards 117 is allotted in one rectangular board base material 128. In FIG. 13, for the purposes of illustration, the LED board 117 of the first stage is designated by symbol 117A, and the LED board 117 of the second stage is designated by symbol 117B. As illustrated in FIG. 13, after the LED board 117B is rotated by 180 degrees to the LED board 117A, the LED board 117B is shifted in a longitudinal direction. Each of the arranging portion 118B in the LED board 117B of the second stage (the rotated board) is arranged to be fitted between the arranging portions 118A in the LED board 117A (the un-rotated board that is not rotated) substantially without any gaps. That is, when the LED board 117 is rotated by 180 degrees, the LED board 117 has a shape such that each of the rotated arranging portion 118 can be fitted between the adjacent arranging portions 118 of the un-rotated LED board 117.

When the LED boards 117 are arranged as described above, a width YC obtained by totalizing width in the Y-axis direction of both the LED boards 117A and 117B can be reduced as compared with a case where the LED boards 117A and 117B are adjacent to each other in the Y-axis direction without fitting the LED boards 117A and 117B to each other. As a result, a length in the Y-axis direction of the board base material 128, consequently, an area thereof can be reduced, and cost thereof can be reduced. In this context, in the LED board 117, the arranging portions 118 and the connecting portions 119 make one plane on one end side of the Y-axis direction. Therefore, when the LED board 117B rotated by 180 degrees is fitted to the LED board 117A, an outer shape of both the LED boards 117A and 117B after being fitted is a substantially rectangular shape. Therefore, when both the LED board 117A and 117B are allotted in the rectangular board base material 128, areas of portions (hatching pattern of FIG. 13) which are not used as the LED board 117 can be reduced, and material cost thereof can be reduced. In the present embodiment, In order to allot the LED boards 117 such that the LED boards 117 are fitted to each other, it is necessary to allot the two LED boards 117 in one set. Therefore, it is preferable to design to form the LED boards 117 of even number in one board base material 128.

Third Embodiment

Next, a third embodiment of the present invention will be described with reference to FIGS. 14 to 17. In the third embodiment, a board-side reflection sheet 30 is laid on a front-side surface of an LED board 217 instead of forming the reflection surface 18R on the LED board 17 of the first embodiment. The board-side reflection sheet 30 is arranged so as to be sandwiched between the chassis-side reflection sheet 21 and the LED board 217. In the third embodiment, constituent parts having the same names as those of the above embodiments are indicated by the same symbols without repeating overlapping descriptions of structures, operations, and effects.

Figure 14:
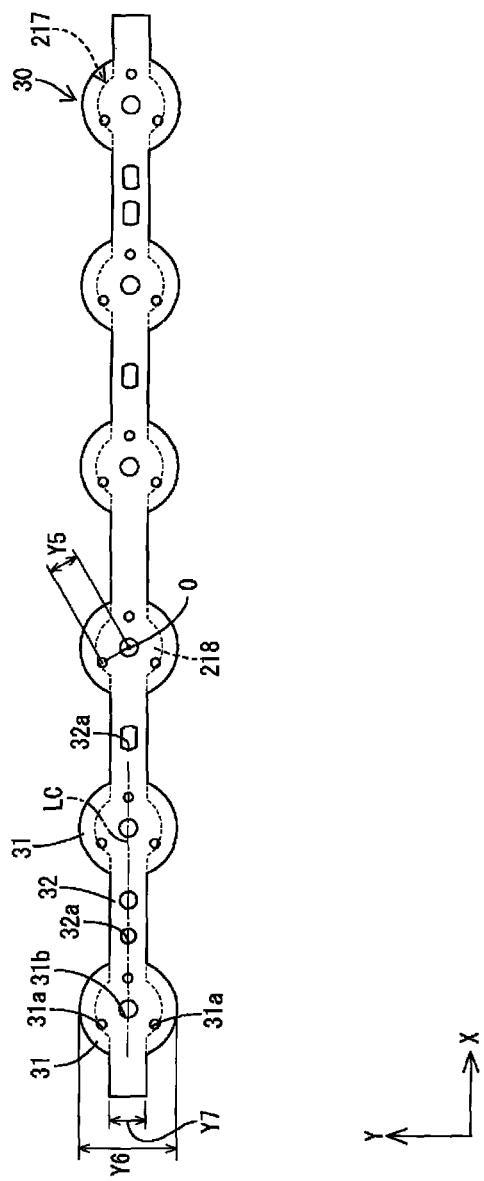
FIG. 14 is a plan view illustrating a board-side reflection sheet according to a third embodiment of the present invention.
Figure 15:
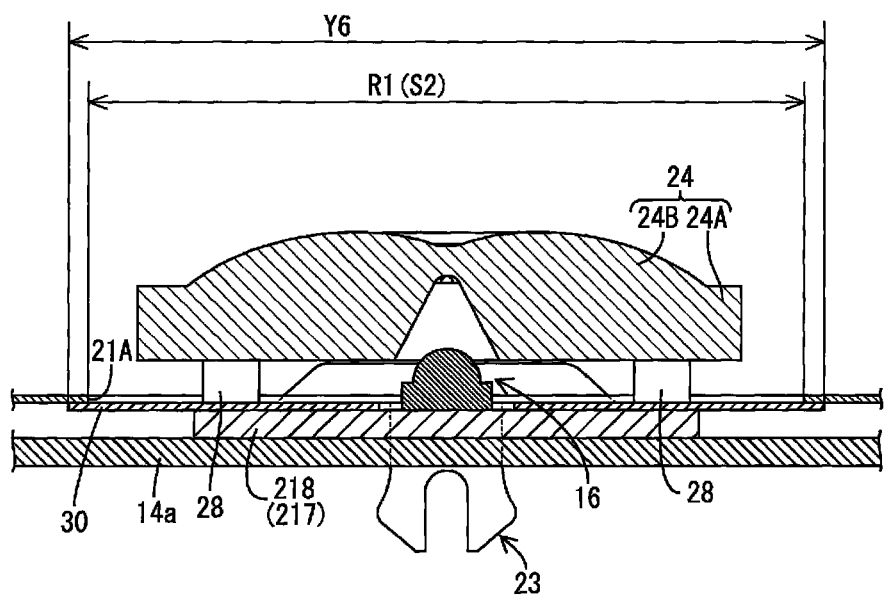
FIG. 15 is a sectional view illustrating an enlarged circumference of an LED in a state where the liquid crystal display device is cut along a short-side direction thereof.

The board-side reflection sheet 30 is made of a synthetic resin, for example, as in the chassis-side reflection sheet 21. A surface of the board-side reflection sheet 30 is colored white, which has excellent reflectivity. As illustrated in FIG. 14, the board-side reflection sheet 30 has the substantially same outer shape as that of the LED board 217. The board-side reflection sheet 30 includes a plurality of light-source-surrounding reflecting portions 31 covering the arranging portions 218 of the LED board 217 and surrounding the LEDs 16 in a plan view, and a plurality of sheet-side connecting portions 32 connecting the adjacent light-source-surrounding reflecting portions 31.

The light-source-surrounding reflecting portion 31 has a circular shape. The light-source-surrounding reflecting portion 31 has an outer diameter Y6 greater than an outer shape of the diffusion lens 24. The light-source-surrounding reflecting portions 31 are arranged at constant intervals along the X-axis direction. In a plan view, the light-source-surrounding reflecting portion 31 includes, at the center thereof, an LED inserting hole 31b having a diameter greater than an outer diameter of the LED 16 at the tip portion 16a thereof formed. Thereby, the light-source-surrounding reflecting portion 31 can be laid so as to surround the LED 16 in a plan view. The outer diameter Y6 (a width in the short direction) is greater than a diameter R1 of the through hole 21A in the chassis-side reflection sheet 21. The light-source-surrounding reflecting portion 31 is provided in the substantially whole area of a region S2 (in other words, a region which is not covered with the chassis-side reflection sheet 21) corresponding to the through hole 21A in a plan view (a state viewed from the upper side of FIG. 15). Thereby, light made incident on the region S2 corresponding to the through hole 21A of the chassis-side reflection sheet 21 can be reflected to the diffuser 15a side by the board-side reflection sheet 30 (mainly, the light-source-surrounding reflecting portion 31). The light-source-surrounding reflecting portion 31 has leg portion inserting holes 31a into which the leg portions 28 can be inserted formed in places corresponding to the leg portions 28 of the diffusion lens 24.

The sheet-side connecting portion 32 has a long rectangular shape in the X-axis direction. The sheet-side connecting portion 32 in the short direction has a width Y7 narrower than the outer diameter Y6 of the light-source-surrounding reflecting portion 31. The sheet-side connecting portions 32 are arranged along a straight line LC connecting centers of the adjacent light-source-surrounding reflecting portions 31. The specific sheet-side connecting portion 32 has an attaching hole 32a formed in a place corresponding to the attaching hole 17a of each of the LED boards 17. The attaching hole 32a is configured so as to allow the insertion of the clip 23.

As described above, in the present embodiment, the plurality of light-source-surrounding reflecting portions 31 is connected by the sheet-side connecting portions 32, and thereby the board-side reflection sheet 30 is configured. Therefore, for example, this configuration improves ease of handling (for example, laying work and conveyance) of the board-side reflection sheet as compared with a configuration in which a board-side reflection sheet having the same shape as that of the light-source-surrounding reflecting portion 31 is laid on each LED 16 on the LED board 217. Thereby, this configuration provides good workability. Furthermore, in the short direction of the board-side reflection sheet 30, the sheet-side connecting portion 32 has the width Y7 narrower than the width Y6 of the light-source-surrounding reflecting portion 31. Thereby, the total area of the board-side reflection sheets can be reduced as compared with the rectangular board-side reflection sheets 30 having the same width as that of the light-source-surrounding reflecting portion 31 over the whole length.

Figure 17:
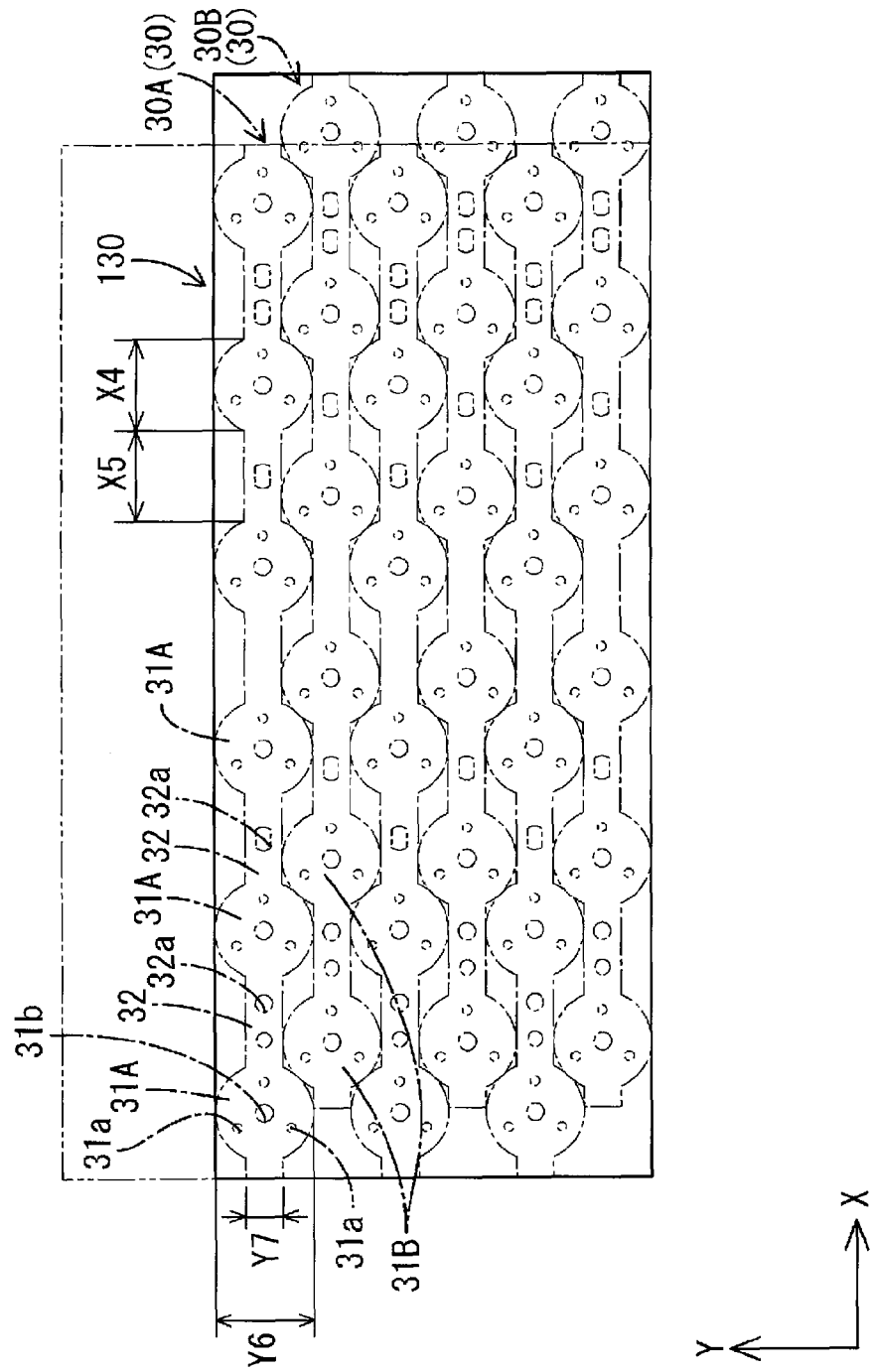
FIG. 17 is a plan view illustrating a method of manufacturing board-side reflection sheets.

Next, a method for manufacturing the board-side reflection sheets 30 will be described. FIG. 17 illustrates a manufacturing method for forming a plurality of board-side reflection sheets 30 from one sheet base material 130. In FIG. 17, for the purposes of illustration, the board-side reflection sheet 30 of the top stage is designated by symbol 30A, and the board-side reflection sheet 30 of the second stage is designated by symbol 30B. The board-side reflection sheet 30A and the board-side reflection sheet 30B are allotted such that each light-source-surrounding reflecting portion 31B of the board-side reflection sheet 30B is fitted between the adjacent light-source-surrounding reflecting portions 31A of the other board-side reflection sheet 30A in the same manner as in the time of manufacturing the LED board 17 of the first embodiment. Thereby, the sheet base material 130 is divided into the plurality of board-side reflection sheets 30. The sheet-side connecting portion 32 has a length X5 greater than a length X4 of the light-source-surrounding reflecting portion 31 in the longitudinal direction of the board-side reflection sheet 30 as in the configuration of the LED board 17. The area of the sheet base material 130 can be reduced by the above configuration as in the LED board 17 in the first embodiment.

Next, operations and effects obtained by using the board-side reflection sheet 30 will be described instead of the reflection surface 18R formed in the LED board 17 of the first embodiment. When the reflection surface 18R is formed in the LED board 17 as in the first embodiment, the forming method is limited to printing and coating and the like. On the other hand, when the board-side reflection sheet 30 is used, a material having a high reflectance can be selected as a material of the sheet, and thereby a reflectance higher than that of the reflection surface 18R is easily set. Therefore, the light can be reflected at a higher reflectance by using the board-side reflection sheet 30 instead of the reflection surface 18R, and a brightness can be increased.

In the present embodiment, the light-source-surrounding reflecting portion 31 of the board-side reflection sheet 30 is provided in the almost whole area of the through hole 21A of the chassis-side reflection sheet 21, and the light made incident on the region S2 corresponding to the through hole 21A can be reflected by the light-source-surrounding reflecting portion 31. On the other hand, in the configuration of the first embodiment, the LED board 17 itself has a reflective function, and the arranging portion 18 needs to have a size such that the arranging portion 18 is provided in the almost whole area of the through hole 21A in order to reflect light in the total area of the region S2. That is, the diameter Y1 of the arranging portion 18 needs to be greater than the diameter R1 of the through hole 21A. However, because the light-source-surrounding reflecting portion 31 has a reflective function in the present embodiment, the arranging portion 218 may not necessarily have a size such that the arranging portion 218 is provided in the total area of the through hole 21A. Therefore, the arranging portion 218 may have a diameter smaller than the diameter of the through hole 21A. For example, as illustrated in FIG. 13, the diameter of the arranging portion 218 can be the minimum diameter capable of supporting the diffusion lens 24. Specifically, the arranging portion 218 may have a radius Y5 substantially the same as a distance between a center (point O) of the arranging portion 218 and the leg portion 28 in a plan view. Thereby, the total area of the LED board 218 can further be reduced as compared with the LED board 17 of the first embodiment, and cost of the LED board can be reduced. From the above, in the present embodiment, cost of the board-side reflection sheets 30 can also be reduced in addition to cost reduction of the LED board 17, and cost reduction can be greatly realized as a whole.

Other Embodiments

The present invention is not limited to the above embodiments described in the above description and the drawings. The following embodiments are also included in the technical scope of the present invention, for example.

(1) In the above embodiments, the arranging portion 18 having a circular shape or a trapezoidal shape is exemplified. However, the present invention is not limited thereto. For example, the arranging portion 18 may have a rectangular shape, a triangular shape, and a rhomboidal shape and the like.

(2) In the above embodiments, the plurality of arranging portions 18 has the same shape. However, the present invention is not limited thereto. One LED board may include the arranging portions having different shapes.

(3) In the above embodiments, means for printing paste on the arranging portions 18 to form the reflection surface 18R is exemplified. However, the present invention is not limited thereto. For example, the reflection surface 18R may be formed on the arranging portions 18 by using forming means for applying white or silver coating, and forming means such as metal vapor deposition.

(4) In the above embodiments, each of the light source units 40 includes the diffusion lenses 24. However, each of the light source units 40 may not include the diffusion lenses 24. When the light source unit 40 does not include the diffusion lenses 24, the size of the LED board 17 can also be set to the minimum size (for example, substantially the same size as that of the body portion 16b of the LED) so as to the LEDs 16.

(5) The shape and material and the like of each of the diffusion lenses 24 are not limited to the above embodiments. Each of the diffusion lenses 24 may be formed to any shape or formed of any material as long as they have a function of diffusing the light.

(6) In the above embodiments, the LEDs 16 including the blue light emitting LED chip and the fluorescent material are exemplified. However, the present invention is not limited thereto. For example, each of the LEDs 16 may include an ultraviolet-emitting LED chip and a fluorescent material. Or, each of the LEDs 16 may include three kinds of LED chips emitting R (red), G (green), and B (blue) single color light.

The three kinds of LED chips emitting R (red), G (green), and B (blue) single color light may be combined.

(7) The configurations of the diffuser and optical sheet may be different from those of the above first embodiment, and can be suitably changed. Specifically, the number of the diffusers 15a, and the number and kind and the like of the optical sheets 15b can be suitably changed. A plurality of optical sheets 15b of the same kind can also be used.

(8) The number of the mounted LEDs 16 included in each of the light source units 40 is not limited to the numbers (five, six, eight) exemplified in the above embodiments. The LEDs 16 of the number other than the above numbers may be mounted on each of the light source units 40.

(9) In the above embodiments, the method for manufacturing the LED board 17 on which the six LEDs 16 are mounted is described as the example. However, the LED board in which the number of the LEDs 16 to be mounted (in other words, the number of the arranging portions 18) is different can also be formed by the same manufacturing method as that of the present embodiment.

(10) In the above third embodiment, the board-side reflection sheet 30 has substantially the same outer shape as that of the LED board 17. However, the present invention is not limited to the shape. For example, the board-side reflection sheet 30 may have a rectangular shape having the same width as that of the light-source-surrounding reflecting portion 31 over the whole length.

(11) In the method for manufacturing the LED boards 17 of the above first embodiment, there is exemplified the method for manufacturing the LED boards 17 in an order of the formation of the circuit patterns, the printing of the reflection surface 18R, the formation of the perforations to the board base material 29, the mounting of the LEDs 16 and the connectors 25, and the dividing to form the LED boards 17. The present invention is not limited thereto. The above order can be suitably changed. For example, after dividing the LED boards 17 are divided and formed from the board base material 29, the circuit patterns may be formed on each LED board 17, the reflection surface 18R may be printed thereon, and the LEDs 16 and the connectors 25 may be mounted thereon. The diffusion lenses 24 may be mounted before the LED boards 17 are formed.

(12) In the above embodiments, the LEDs 16 are two-dimensionally arranged in the chassis 14. However, the LEDs 16 may be one-dimensionally arranged. Specifically, the present invention includes arrangement of the LEDs 16 only in the vertical direction and arrangement of the LEDs 16 only in the horizontal direction.

(13) In the above embodiments, the LEDs 16 used as the point light sources is exemplified. However, the point light sources other than the LEDs may be used.

(14) In the above embodiments, the chassis 14 is arranged such that the short-side direction thereof is aligned with the vertical direction. However, the chassis 14 may be arranged such that the longitudinal direction thereof is aligned with the vertical direction.

(15) In the above embodiments, TFTs are used as switching elements of the liquid crystal display device. However, the technique can be applied to liquid crystal display devices including switching elements other than TFTs (for example, thin film diode (TFD)). The technique can be applied not only to color liquid crystal display devices but also to black-and-white liquid crystal display devices.

(16) In the above embodiments, the liquid crystal display device including the liquid crystal panel as a display element is exemplified. However, the present invention can be applied to display devices including other types of display elements.

(17) In the above embodiments, the television receiver including the tuner is exemplified. However, the present invention can be applied to a display device without a tuner.

The invention claimed is:

1. A light source unit comprising:
a plurality of light sources; and
an elongated board including a plurality of first portions and a second portion, each of the plurality of first portions including at least one of the plurality of light sources thereon and the second portion is provided between two adjacent ones of the plurality of first portions, wherein
the elongated board has an outer shape including first widths in a latitudinal direction of the board crossing the plurality of first portions as seen in a plan view and a second width in the latitudinal direction of the board crossing the second portion as seen in a plan view, the second width being smaller than each of the first widths; and
the second portion has a length greater than a length of each of the plurality of first portions in a longitudinal direction of the board.

2. The light source unit according to claim 1, wherein:
the plurality of light sources are arranged along the longitudinal direction of the board as seen in the plan view;
the second portion is arranged on a straight line between the plurality of light sources; and
the second portion includes a wiring supplying electric power to each of the plurality of light sources provided along the longitudinal direction of the board.

3. The light source unit according to claim 1, wherein the second portion is provided on a straight line connecting centers of the two adjacent ones of the plurality of first portions.

4. The light source unit according to claim 1, wherein each of the plurality of first portions includes a reflection surface on a surface on which the plurality of light sources are arranged.

5. The light source unit according to claim 1, wherein the plurality of light sources are light-emitting diodes.

6. The light source unit according to claim 1, further comprising a diffusion lens provided on each of the plurality of first portions so as to cover each of the plurality of light sources and configured to diffuse light from each of the plurality of light sources, wherein:
each of the plurality of first portions has a circular shape greater than an outer shape of the diffusion lens in a plan view; and
each of the plurality of light sources is arranged at a center of each of the plurality of first portions in a plan view.

7. A lighting device comprising:
the light source unit according to claim 1; and
a chassis to which the light source unit is attached.

8. A display device comprising:
the lighting device according to claim 7; and
a display panel configured to provide display using light from the lighting device.

9. The display device according to claim 8, wherein the display panel is a liquid crystal panel using liquid crystals.

10. A television receiver comprising the display device according to claim 8.

11. A light source unit comprising:
a plurality of light sources; and
an elongated board including a plurality of first portions and a second portion, each of the plurality of first portions including at least one of the plurality of light sources thereon and the second portion is provided between two adjacent ones of the plurality of first portions, wherein the elongated board has an outer shape including first widths in a latitudinal direction of the board crossing the plurality of first portions as seen in a plan view and a second width in the latitudinal direction of the board crossing the second portion as seen in a plan view, the second width being smaller than each of the first widths; and the board includes an outer shape such that, when one board is rotated by 180 degrees, each of the plurality of first portions of another board that is not rotated is fitted between the plurality of first portions of the rotated one board.

12. The light source unit according to claim 11, wherein the second portion has a length greater than a length of each of the plurality of first portions in a longitudinal direction of the board.

13. A method of manufacturing an elongated board used for a light source unit, comprising:

dividing one rectangular board base material to form a plurality of elongated boards used for a light source unit, each of the plurality of elongated boards including a plurality of first portions and a second portion, each of the plurality of first portions includes a light source thereon and the second portion is provided between two adjacent ones of the plurality of first portions; wherein the second portion has a width smaller than a width of each of the plurality of first portions in a latitudinal direction of the board as seen in a plan view, and the dividing step including dividing the board base material into at least a first board and a second board such that each of the plurality of first portions of the second board adjacent to the first board is located between two adjacent ones of the plurality of first portions of the first board.

* * * * *